United States Patent [19]
Hansen

[11] Patent Number: 5,857,719
[45] Date of Patent: Jan. 12, 1999

[54] PIPE COUPLING

[76] Inventor: Albert Frederick Hansen, 156 Lower Dent Street, Whangarei, New Zealand

[21] Appl. No.: 503,067

[22] Filed: Jul. 14, 1995

[30] Foreign Application Priority Data

Jul. 15, 1994 [NZ] New Zealand .................. 264022

[51] Int. Cl.⁶ .................................................. F16L 37/092
[52] U.S. Cl. ........................................ 285/343; 285/382.7
[58] Field of Search ............................ 285/40, 342, 343, 285/382.7, 913, 914, 339, 314

[56] References Cited

FOREIGN PATENT DOCUMENTS 167724  6/1972  New Zealand .

*Primary Examiner*—Eric K. Nicholson
*Attorney, Agent, or Firm*—Dorsey & Whitney LLP

[57] ABSTRACT

A pipe coupling comprises a body part having a hollow interior and a rotatable sleeve captively mounted to the body part of the coupling such that the end of a length of pipe connected to the coupling passes through the rotatable sleeve to the hollow interior of the coupling. The rotatable sleeve has a tapered interior of narrowing diameter towards the pipe entry end of the rotatable sleeve. A circular band is coaxially positioned inside the rotatable sleeve. In use a pipe end is pushed into the threaded sleeve to the hollow interior of the coupling, and through the circular band. Force on the pipe away from the coupling further closes the circular band about the pipe end. Preferably the circular band has a threaded interior.

7 Claims, 4 Drawing Sheets

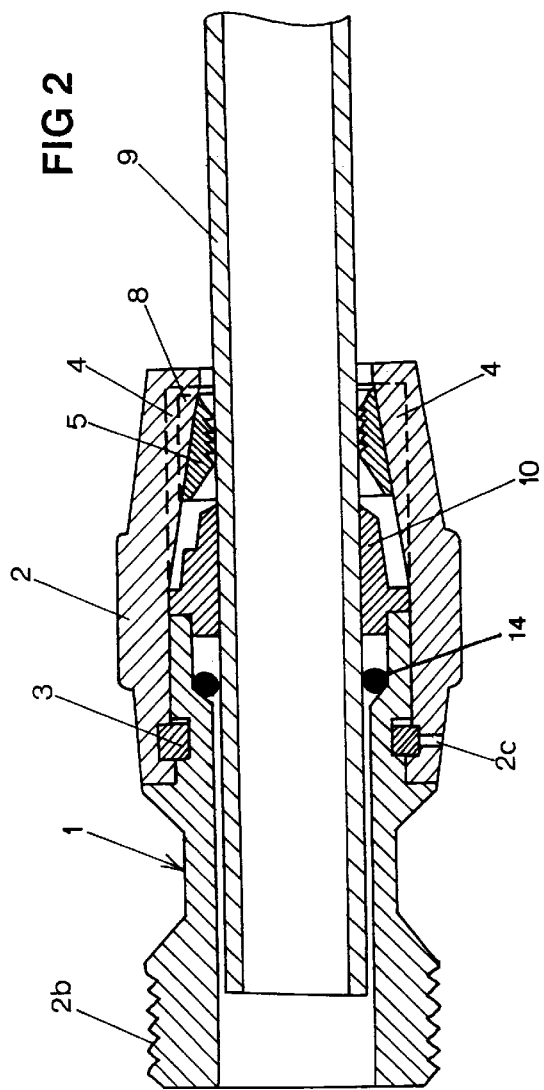
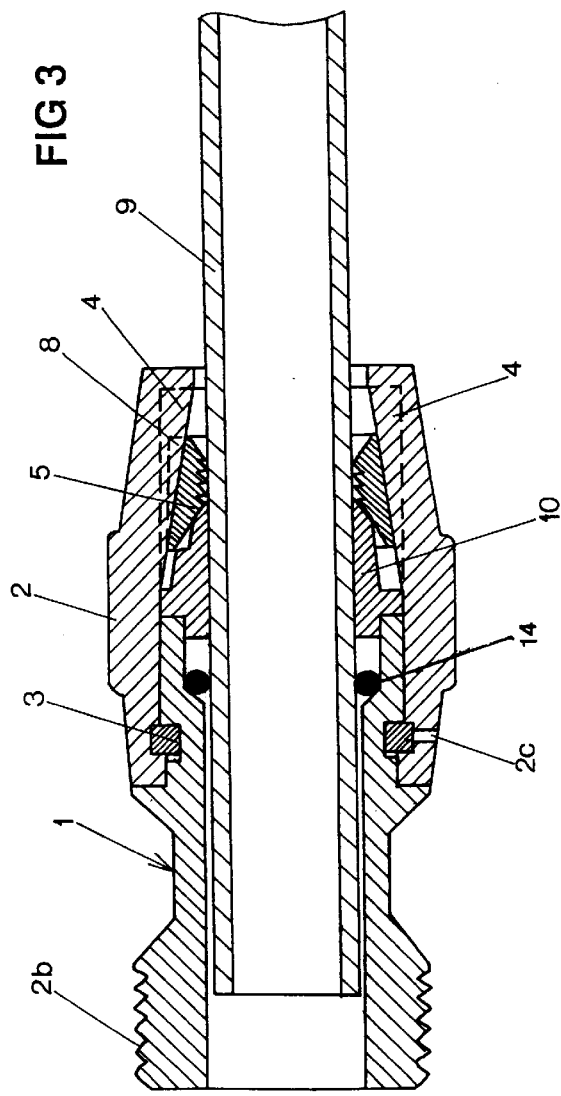

PIPE COUPLING

FIELD OF INVENTION

The invention comprises a pipe coupling.

BACKGROUND

Various forms of couplings for piping formed of plastics materials are known. The present invention provides an improved or at least alternative form of pipe coupling.

SUMMARY OF INVENTION

In broad terms the invention comprises a pipe coupling comprising a body part including a hollow interior for fluid flow through the coupling, a rotatable sleeve captively mounted to the body part of the coupling such that the end of a length of pipe connected to the hollow interior of the coupling passes through the rotatable sleeve to the hollow interior of the coupling, the rotatable sleeve having a tapered interior of narrowing diameter towards the pipe entry end of the rotatable sleeve, a circular band coaxially positioned inside the rotatable sleeve, through the interior of which circular band a pipe end passes and is engaged by being pushed into the threaded sleeve to connect to the hollow interior of the coupling, and which circular band is forced to further close about the pipe end by said tapered interior of the rotatable sleeve by force on the pipe away from the coupling.

Preferably the pipe coupling also comprises means coupling the circular band to the interior of the rotatable sleeve and the circular band has a threaded interior such that rotation of the sleeve threads the band around the exterior of a pipe end pushed into the hollow sleeve. The rotatable sleeve may be given a few turns to rotate the threaded circular band around the exterior of a pipe end pushed into the coupling to thread the threaded band onto the exterior of the pipe end to further link the pipe to the coupling. In preferred forms of the pipe coupling the rotatable sleeve may be rotated in the opposite direction to allow the pipe to be released or removed from the coupling.

Pipe couplings of the invention may be formed as "straight" couplings which are used to couple two pipe ends together in line. Alternatively pipe couplings of the invention may be formed as "elbows" i.e. right angles or similar, T's i.e. a coupling for connecting three pipe ends together, or as a coupling to connect a pipe end to a piece of equipment such as a pump or similar.

DESCRIPTION OF DRAWINGS

The invention will be further described with reference to the accompanying drawings which show a preferred form coupling of the invention intended for coupling a pipe end to a piece of equipment, by way of example. In the drawings:

FIG. 2 shows the coupling in cross-section, showing the end of a length of pipe pushed into the coupling but before rotation of the rotatable sleeve to screw the circular band onto the pipe end, FIG. 3 shows the coupling in cross-section similar to FIG. 2 but after rotation of the rotatable sleeve.

DESCRIPTION OF PREFERRED FORM

The coupling comprises a body part generally indicated at 1 to which is mounted a rotatable collar or sleeve 2. The sleeve 2 may have a knurled exterior for hand gripping or a hexagonal exterior as indicated at 2a so that in use it can be turned with a spanner if necessary.

Figure 1:
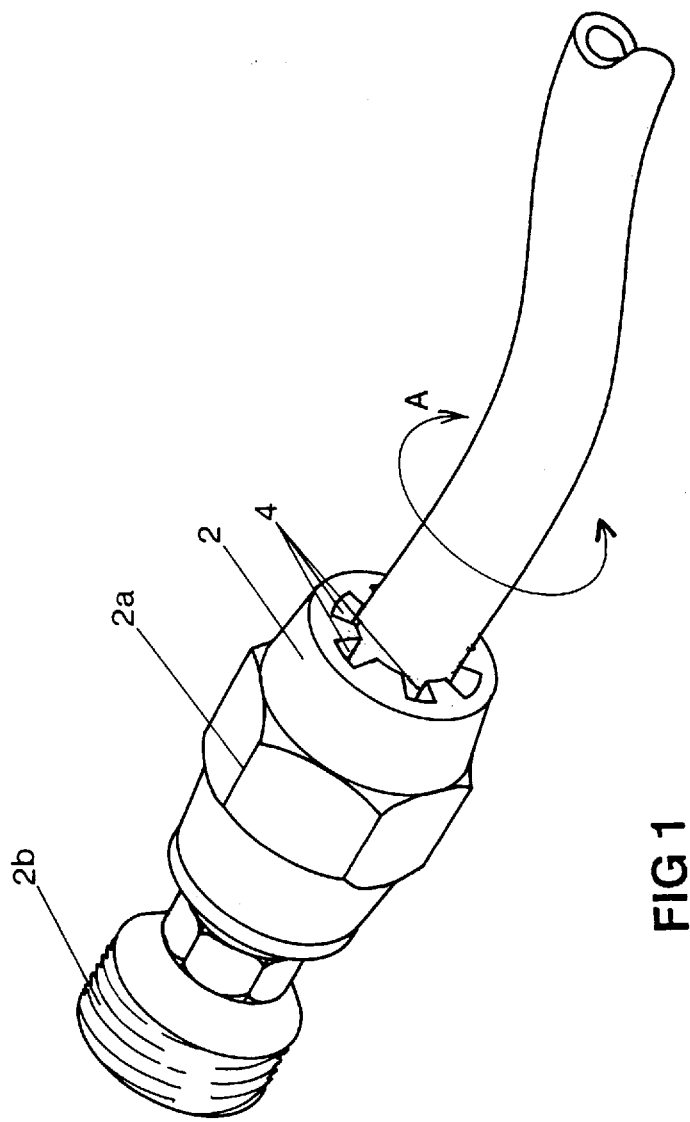
FIG. 1 shows the preferred form coupling with a length of pipe connected to the coupling.
Figure 7:
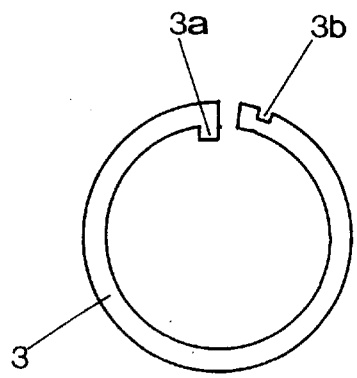
FIG. 7 shows a circlip which holds the rotatable sleeve to the body part of the coupling as will be described.

The sleeve 2 can be rotated relative to the body part 1 of the coupling as indicated by arrow A in FIG. 1, and the sleeve 2 is captively mounted on the body part 1 of the coupling, in the preferred form shown by a circlip 3 mounted in an annular recess about the body part of the coupling engaging into a corresponding annular recess in the internal wall of the coupling nut (see FIGS. 2 and 3). The circlip 3 is shown separately in FIG. 7.

The rotatable sleeve 2 has a tapered interior which narrows towards the pipe entry end of the rotatable sleeve as shown in FIGS. 2 and 3. In the preferred form coupling shown in the drawings the rotatable sleeve 2 also has a number of longitudinal slots or grooves 4 about its tapered interior, running parallel with the longitudinal axis of the coupling. These slots or grooves 4 can be seen from the exterior of the end of the rotatable sleeve in FIG. 1, and are indicated in broken lines in FIGS. 2 and 3.

A circular band 5 is positioned inside the rotatable sleeve 2—see FIGS. 2 and 3. The band 5 can also be seen in FIGS. 4 and 5 which show the coupling with the rotatable sleeve 2 removed. The band 5 is split at a point 6 somewhat like a circlip. The exterior of the band 5 engages the tapered interior of the rotatable sleeve 2, such that as the circular band 5 is moved towards the pipe entry end of the rotatable sleeve 2 where the internal diameter of the rotatable sleeve 2 is smallest, the band 5 will be forced to close further. Preferably the exterior of the circular band 5 is also tapered with a reducing diameter towards the pipe entry end of the coupling so that it will better coact with the tapered interior of the rotatable sleeve 2.

The body of the coupling shown in the drawings has a threaded end 2b for screwing into the inlet or outlet fitting of a pump or other piece of equipment.

In use of the coupling, when a pipe end 9 is pushed into the interior of the rotatable sleeve 2 it will also pass through the interior of the circular band 5. As the pipe end enters the coupling and passes through the circular band 5 it will tend to push the circular band back slightly so that the pipe can easily pass through the circular band and fully into the coupling and through an O-ring 14 which is preferably included to provide a fluid tight seal between the coupling and the pipe. When the pipe is subsequently pulled back away from the coupling, it will pull the circular band back towards the pipe entry end of the rotatable sleeve 2 where the internal diameter of the rotatable sleeve 2 is smallest, in so doing forcing the band to close or clamp more tightly about the pipe to grip the pipe end and link the pipe to the coupling. The interior of the circular band 5 may be threaded as will be further described, or alternatively may be simply provided with barbs which will bite into the exterior of the pipe as the circular band is forced to clamp more tightly about the pipe by the tapered interior of the rotatable sleeve 2, or other roughened gripping surface to the internal band.

Figure 4:
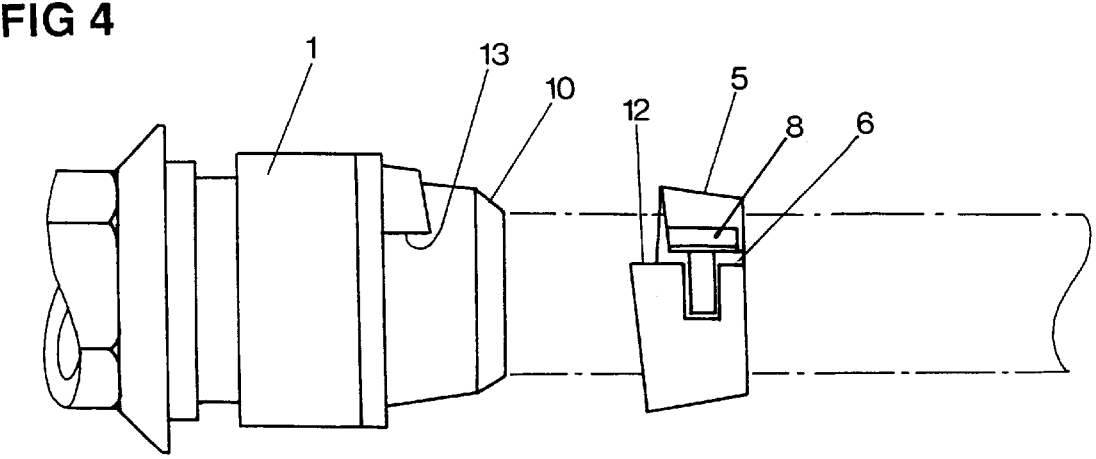
FIGS. 4 and 5 show the body part and circular band of the coupling with the rotatable sleeve removed.
Figure 5:
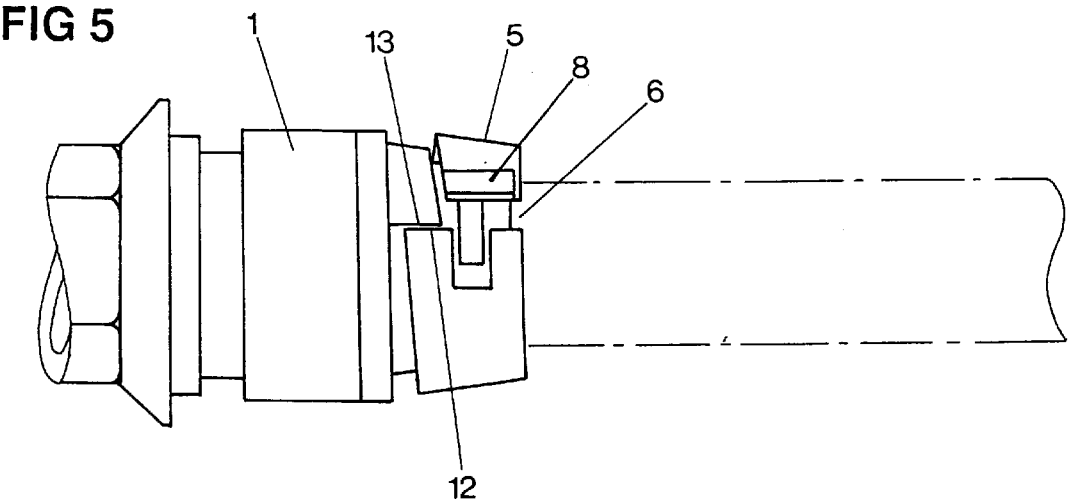

In the preferred form coupling the circular band 5 has a raised tab 8—see FIGS. 4 and 5. This tab 8 engages into any of the slots 4 in the interior of the rotatable sleeve 2 (see FIGS. 2 and 3 where the tab is shown in dotted lines), so that the circular band 5 is effectively coupled to the rotatable sleeve and will rotate with the rotatable sleeve 2. In the preferred form coupling shown in the drawings the circular band 5 also has a threaded interior as shown. The arrangement is such that if the sleeve 2 is turned, the band 5 will also be rotated around the pipe 9, because of the tab 8 engaging into a slot 4 of the rotating sleeve 2, and the threads of the band 5 will thread onto the pipe end. The hand of the threads on the interior of the band 5 is such that as the band 5 is turned about the pipe end in one direction it will move on the pipe towards the pipe entry end of the coupling. As it so threads onto the exterior of the pipe, because of the tapered interior of the rotatable sleeve 2 as described, the circular band 5 will at the same time be forced to close more as it moves, so gripping or clamping the pipe end. The sleeve 2 may be rotated, typically by hand and finally by a spanner.

In the preferred form coupling shown in the drawings the circular band 5 is split at 6 as described previously, and in addition it is wider on one side of the split 6 than on the other to give the circular band a protruding nose 12 as shown in FIGS. 4 and 5. The body part 10 of the coupling has a shaped complementary part 13 as shown and the arrangement is such that to release the pipe end from the coupling, the rotatable sleeve 2 may be rotated in the opposite direction to move the threaded band 5 back away from the pipe entry end of the coupling until the nose 12 of the band 5 catches the shaped part 13 of the body of the coupling. This will then cause the threaded band 5 to be opened slightly as shown in FIG. 5, so that the pipe end can be withdrawn back off the coupling. Also, the entrance to the interior of the circular band is tapered towards the threaded interior of the circular band 5. This further assists in opening the circular band when the nose 12 of the band 5 catches the shaped part 13 of the body of the coupling, as at the same time the annular portion of the body of the coupling surrounding the aperture into the body of the coupling through which the pipe end passes engages the tapered entry to the band 5 to further open the band 5. Less preferred forms of the coupling may not include such a release system as described above but the release system shown in the drawings is preferred.

The preferred form coupling has a number of grooves 4 through the interior of the sleeve 2 as described, but in fact only one groove 4 or equivalent to engage the tab 8 or similar is essential. Alternatively, the band 5 may have a number of tabs 8 or similar spaced about its circumference, which are engaged by a number of grooves along the interior of the rotatable sleeve 2.

Referring again to the circlip 3, should it be desirable or necessary to remove the rotatable sleeve 2 from the body part 1 of the coupling, a small pin such as a small nail is inserted through a small hole 2c through the inner end of the coupling nut adjacent the circlip, as shown in FIGS. 2 and 3. The circlip has one end formed into a tab 3a which engages into a corresponding hole in the bottom of the annular recess about the body part of the coupling in which the circlip is housed. With the pin inserted through the hole 2c, the sleeve 2 is rotated until the end of the pin drops into the groove 3b across the other end of the circlip. The sleeve 2 is then rotated a little more to close the circlip, the other end 3a of the circlip being caught as described, which then enables the rotatable sleeve 2 to be withdrawn back off the body 1 of the coupling.

The O-ring 14 can preferably move in a shaped recess behind the body part 10 and the main body 1. The O-ring provides a positive seal for both negative and positive pressures. For a negative pressure the O-ring 14 is drawn back into the position shown in FIGS. 2 and 3, where the O-ring is forced up a taper to give a positive seal between the pipe end 9 and the main body 1. For positive pressures the O-ring 14 is forced away from the pipe end and forms a seal between the pipe, the main body 1 and the body part 10.

Figure 6:
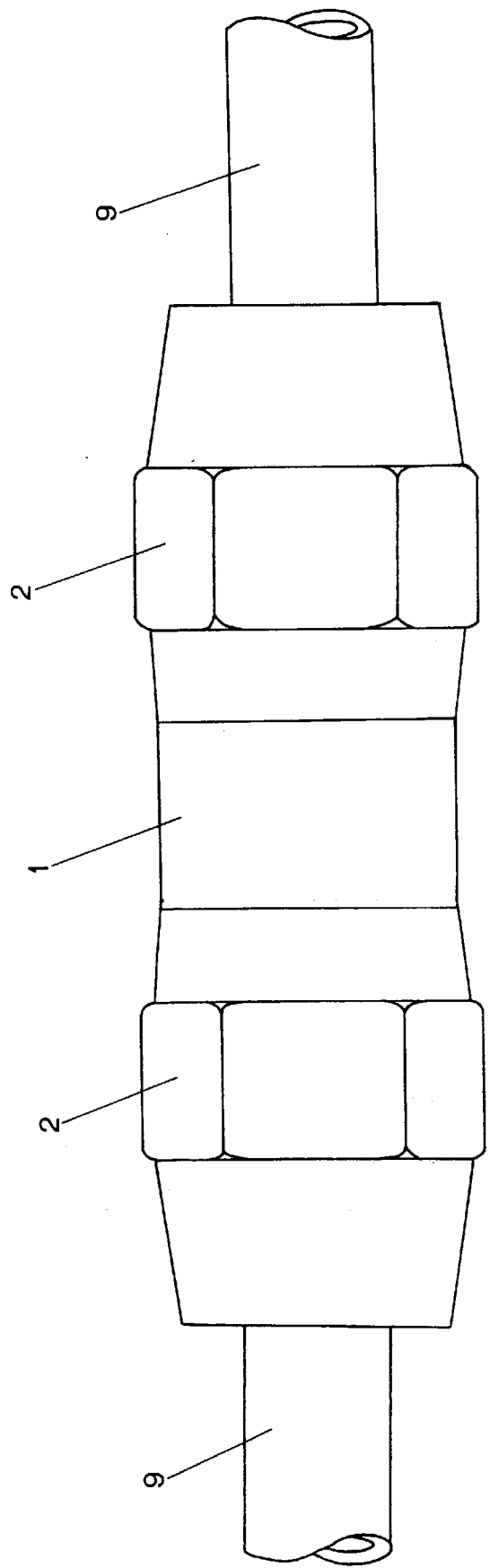
FIG. 6 shows a "straight" coupling of the invention for coupling two pipe ends together in line.

As stated the preferred form coupling shown in FIGS. 1 to 5 is intended to couple a pipe end to a piece of equipment such as a pipe. FIG. 6 shows a "straight coupling" for coupling two pipe ends together in line. The design of the coupling on each side is the same as shown in FIGS. 1 to 5. The coupling may also be formed in other configurations such as an "elbow" coupling similar to the straight coupling of FIG. 6 but with a bend of any desired angle or as a T coupling for coupling three pipe ends together.

The forgoing describes the invention including a preferred form thereof. Alterations and modifications as will be obvious to those skilled in the art are intended to be incorporated within the scope hereof as defined in the following claims.

I claim:

1. A pipe coupling comprising:

a body part including a hollow interior for fluid flow through the coupling, a rotatable sleeve captively mounted to the body part in a longitudinally fixed position on the body part of the coupling such that an end of a length of pipe connected to the hollow interior of the body part of the coupling enters the coupling at a pipe entry end of the rotatable sleeve and passes through the rotatable sleeve to the hollow interior of the coupling, the rotatable sleeve having a tapered interior of narrowing diameter towards the pipe entry end of the rotatable sleeve, a circular band coaxially positioned inside the rotatable sleeve, through the interior of which circular band the pipe end passes and is engaged by being pushed into the rotatable sleeve to connect to the hollow interior of the body part of the coupling, and which circular band is forced to further close about the pipe end by the co-action of said tapered interior of the rotatable sleeve and pulling the pipe end longitudinally away from the coupling.

2. A pipe coupling according to claim 1, also comprising means coupling the circular band to the interior of the rotatable sleeve and wherein the circular band has a threaded interior such that rotation of the sleeve will thread the band around the exterior of the pipe end.

3. A pipe coupling according to claim 2, wherein the rotatable sleeve has at least one longitudinal slot or groove along its tapered interior running substantially parallel with the longitudinal axis of the coupling and the circular band includes a raised tab which engages into said longitudinal slot or groove in the rotatable sleeve to couple the circular band to the interior of the rotatable sleeve.

4. A pipe coupling according to claim 2, wherein the exterior of the circular band is tapered with a reducing diameter towards the pipe entry end of the rotatable sleeve.

5. A pipe coupling according to claim 4, wherein the hand of the threads on the interior of the circular band is such that rotation of the rotatable sleeve in one direction will move the circular band on the pipe end towards the pipe entry end of the coupling to tighten the circular band about the pipe end.

6. A pipe coupling according to claim 5, wherein the circular band has a longitudinal split and is wider on one side of the longitudinal split than on the other side of said split to give the circular band a protruding nose on one side of said split through the circular band and wherein the body part of the coupling includes a part shaped to engage said protruding nose of the circular band such that rotation of the rotatable sleeve in the opposite direction will move the circular band away from the pipe entry end of the coupling and said protruding nose of the circular band to catch said shaped part of the body of the coupling to open the circular band to release the pipe end.

7. A pipe coupling according to claim 6, wherein the entrance to the interior of the circular band on the side of the circular band opposite to the pipe entry end of the rotatable sleeve is tapered with reducing diameter towards the interior of the circular band, and an annular portion of the body part of the coupling surrounding an aperture into the body part of the coupling through which the pipe end passes into the hollow interior of the body part of the coupling is shaped to engage said tapered entry to the circular band to further open the circular band when the rotatable sleeve is rotated in said opposite direction until said protruding nose of the circular band catches said shaped part of the body of the coupling to release the pipe end.

\* \* \* \* \*